United States Patent
Dang et al.

(10) Patent No.: US 7,680,372 B2
(45) Date of Patent: Mar. 16, 2010

(54) MICRO-OPTICS PHOTONIC BANDGAP FIBER COUPLER

(75) Inventors: Thien Dang, Phoenix, AZ (US); Glen A. Sanders, Scottsdale, AZ (US); Tim Spicer, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 9 days.

(21) Appl. No.: 12/163,307

(22) Filed: Jun. 27, 2008

(65) Prior Publication Data

US 2009/0324169 A1   Dec. 31, 2009

(51) Int. Cl.
  G02B 6/26    (2006.01)
  G02B 6/42    (2006.01)
  G02B 6/32    (2006.01)
  H01S 3/30    (2006.01)
  H01S 3/08    (2006.01)
  H01S 3/081   (2006.01)
  H01S 3/083   (2006.01)

(52) U.S. Cl. .................. 385/31; 385/48; 385/32; 385/33; 385/34; 372/92; 372/93; 372/94; 372/6

(58) Field of Classification Search ............. 385/31–34, 385/39, 48; 372/6, 92–94
See application file for complete search history.

(56) References Cited

U.S. PATENT DOCUMENTS

| | | | |
|---|---|---|---|
| 4,775,214 A * | 10/1988 | Johnson ................... | 385/12 |
| 5,436,925 A | 7/1995 | Lin et al. | |
| 5,889,904 A * | 3/1999 | Pan et al. ................. | 385/24 |
| 7,327,460 B2 | 2/2008 | Sanders et al. | |
| 2003/0118073 A1 * | 6/2003 | Rockwell .................. | 372/70 |
| 2004/0061863 A1 | 4/2004 | Digonnet | |
| 2004/0263856 A1 | 12/2004 | Willig et al. | |
| 2006/0227331 A1 | 10/2006 | Vollmer et al. | |
| 2007/0242276 A1 | 10/2007 | Hughes et al. | |
| 2008/0030741 A1 * | 2/2008 | Digonnet et al. ........ | 356/483 |
| 2008/0094636 A1 * | 4/2008 | Jin et al. ................... | 356/466 |

FOREIGN PATENT DOCUMENTS

WO    9828827    7/1998

OTHER PUBLICATIONS

European Patent Office, "European Search Report", Nov. 10, 2009, Published in: EP.

* cited by examiner

*Primary Examiner*—Frank G Font
*Assistant Examiner*—Robert Tavlykaev
(74) *Attorney, Agent, or Firm*—Fogg & Powers LLC

(57) ABSTRACT

A resonator sensing device having an optics coupler device for communicating light between light source(s) and sensor (s) and a hollow core fiber resonator. Light from one resonator fiber tip is coupled to a second resonator fiber tip via a graded index (GRIN) lens having the appropriate pitch such that the maximum coupling efficiency is achieved and having two angled surfaces. The angled surfaces are coated with an appropriate coating having a reflectance R in order to achieve the desired degree of coupling. Light reflected by the second angled surface is captured with another lens (such as a microlens) and coupled to a third fiber segment (coupled port). The optical parameters for the GRIN lens and the microlens are tailored to have the least loss.

13 Claims, 3 Drawing Sheets ns device 20 formed in accordance with an embodiment
MICRO-OPTICS PHOTONIC BANDGAP FIBER COUPLER

BACKGROUND OF THE INVENTION

Photonic bandgap fiber, including hollow core fiber, has the potential to replace conventional solid core optical fiber in numerous applications. Optical components utilizing this class of fiber are limited at this time.

Conventional couplers fall into three main classes: fused; lapped; and micro-optics. Micro-optic couplers are employed to split/combine two different wavelengths such as in a Wavelength Division Multiplexer or to split/combine orthogonal polarization states. Fused and lapped couplers are most commonly used for optical power redistribution.

There is an immediate need for a low loss coupler having hollow core fiber as a major component for resonator sensing applications.

SUMMARY OF THE INVENTION

The present invention is an optical coupler that falls outside of the fused and lapped coupler classes in that it employs reflection rather than evanescent wave coupling to redistribute the optical power.

The present invention uses some concepts from existing micro-optics devices such as GRIN or microlens to couple light into and out of fiber. The light from one fiber tip is coupled to a second fiber tip (throughput port) via one GRIN lens having the appropriate pitch such that the maximum coupling efficiency is achieved and having two angled surfaces. The angled surfaces are coated with an appropriate coating having a reflectance R in order to achieve the desired degree of coupling. Light reflected by the angled surface is captured with another lens (such as a microlens) and coupled to a third fiber segment (coupled port). The optical parameters for the GRIN lens and the microlens are tailored to have the least loss.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
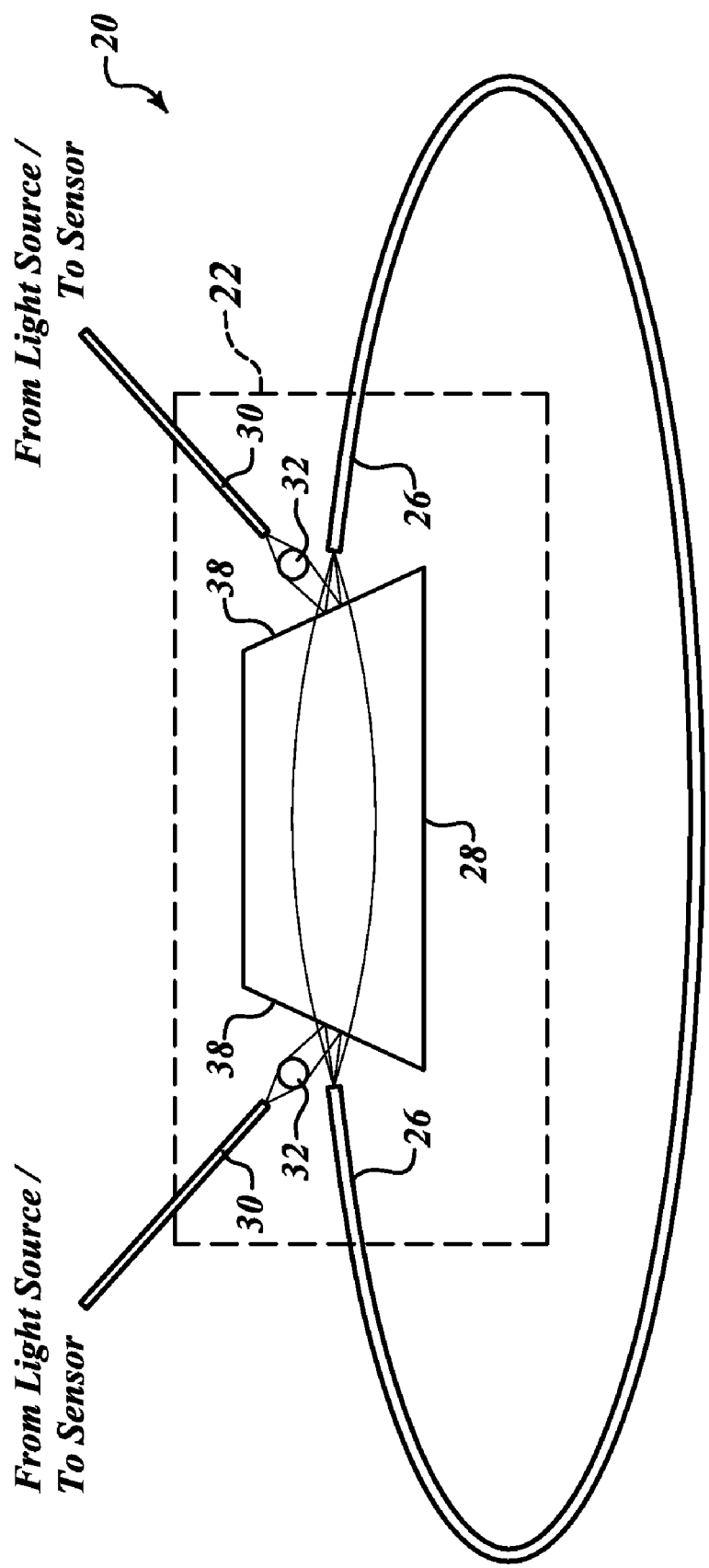
FIG. 1 illustrates a partial view of an example resonator sensing device formed in accordance with an embodiment of the present invention.

FIG. 1 illustrates a partial view of an optical ring resonator sensing device 20 formed in accordance with an embodiment of the present invention. The resonator sensing device 20 includes a resonator fiber 26, second and third (non-resonator) fibers 30, first and second microlenses 32, a graded index (GRIN) lens 28 and a package 22. The package 22 holds the fibers 30, microlenses 32, resonator fiber 26 and GRIN lens 28 in a precise configuration, such that light that comes out of one of the fibers 30 from a light source, such as a laser diode (not shown), is focused by the microlenses 32 then reflected off of the GRIN lens 28 and into the ends of the resonator fiber 26.

The GRIN lens 28 is sized and optically-configured in order to allow light to pass between each end of the fiber 26, forming a resonator (closed optical loop) that includes the GRIN lens 28 and the optical fiber 26. At resonance, on average, an optical photon will make multiple round-trips around the resonator loop prior to being reflected by the GRIN lens back into one of the fibers 30, depending on the direction of propagation of light. Resonance is defined as the condition in which the resonator's closed optical loop pathlength is equal to an integer number of wavelengths. A reflective coating located on the edge of the GRIN lens 28 allows the edge to reflect a chosen wavelength of light with a chosen reflection coefficient and transmit the chosen wavelength of light with a predetermined transmission coefficient. The fiber 26 is a photonic bandgap fiber, such as a hollow core fiber. The other fibers 30 may also be a photonic bandgap fiber but can also be standard single mode or polarization maintaining fiber.

Edges 38 of the GRIN lens 28 that are closest to the exposed ends of the fiber 26 are angled in order to allow reflection of light between the ends of the fiber 26 and proximate microlens 32 and fiber 30. The angled edge 38 of the GRIN lens 28 is coated with a dielectric coating that may include multiple layers, that allows light to reflect off it as well as let light pass between the ends of the fiber 26. Typical distances between the fiber 30 and the microlens 32 is on the order of 0 to 3 mm; the microlens 32 to the GRIN lens 28 is between 0.05 to 3 mm; and the fiber 26 to the GRIN lens 28 is between 0.01 and 1 mm. Final distance values are determined based on the lens designs. In most situations, the desired angular values for the GRIN lens angled facet is approximately between 8 to 20 degrees.

Tight mechanical tolerances will be the first step to achieving a working device, followed by alignment with active feedback. The first may require the micro-machining technology for production.

Figure 2:
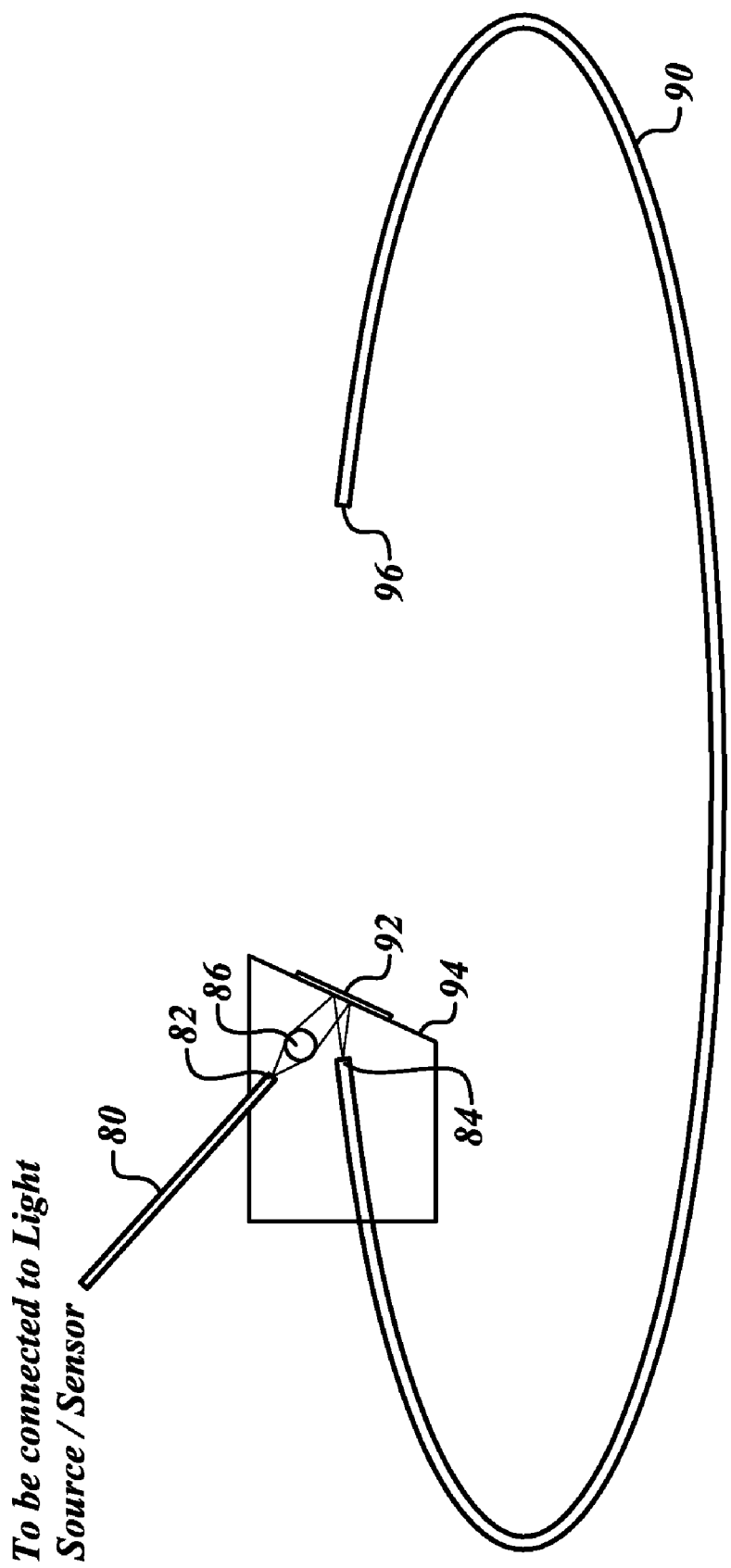
FIG. 2 illustrates a partial view of an example device used to assemble the resonator sensing device as shown in FIG. 1.

As shown in FIG. 2, a resonator loop fiber 90, an input fiber 80 a first pair of fiber ends 82, 84 and microlens 86 are aligned on, and subsequently attached to, a subassembly mount 94 (jig). A high reflectance mirror 92 is temporarily attached to the subassembly mount 94. The fiber ends 82, 84 and the microlens 86 are preferably attached to the subassembly mount 94 with an epoxy. The temporary mirror 92 is temporarily held in place with detachable epoxy (used to tack components in place for alignment and could be removed with solvent).

A light signal from a light source (not shown in FIG. 2) is sent via the fiber 80 through the end 82, the lens 86 and then reflected off the mirror 92 into the fiber end 84. The signal coming back out of the second end 96 of the resonator loop fiber is tracked for optical power (more power means light is going through fiber 90). This procedure is then repeated by putting an identical set of components forming subassembly 94 on the second end 96 of the resonator fiber 90, coupling light into second end 96 and maximizing the signal emanating from fiber end 84, mirror 92, through lens 86 and through fiber 80.

After alignment the subassemblies 94 are mated to the GRIN lens 28 by removing temporary mirrors 92 and final alignment is performed. Each subassembly mount 94 is mated to the grin lens 28 using a sleeve to define the limits of the mechanical motion. Circular sleeves (and other forms) are commercially available.

The final alignment of subassemblies 94 to the GRIN lens is performed by injecting light via the fiber 80 into the resonator fiber loop and sweeping the frequency of the light. The output light amplitude from the fiber 80 adjacent to the fiber end 96 is monitored to maximize the heights of resonance peaks as the frequency of the light source is swept. The resonance signal requires a modulation signal, either on the optical frequency of the input light (preferred) or on the length of the resonator (e.g. by stretching the fiber 90). Then loss and polarization extinction ratio (and other performance evaluation parameters) are measured at a sensor (not shown). The subassembly mount 94 is adjusted until the desired output values are attained. The subassembly mount 94 can be adjusted using a 6-axis positioner (xyz translation stage with tip/tilt/rotation capability). Some positioners come with piezoelectric transducer (pzt) control that can make sub-micron adjustments. After the alignment is optimized, the attachments to the GRIN lens are made permanent, via epoxy or other means.

Figure 3:
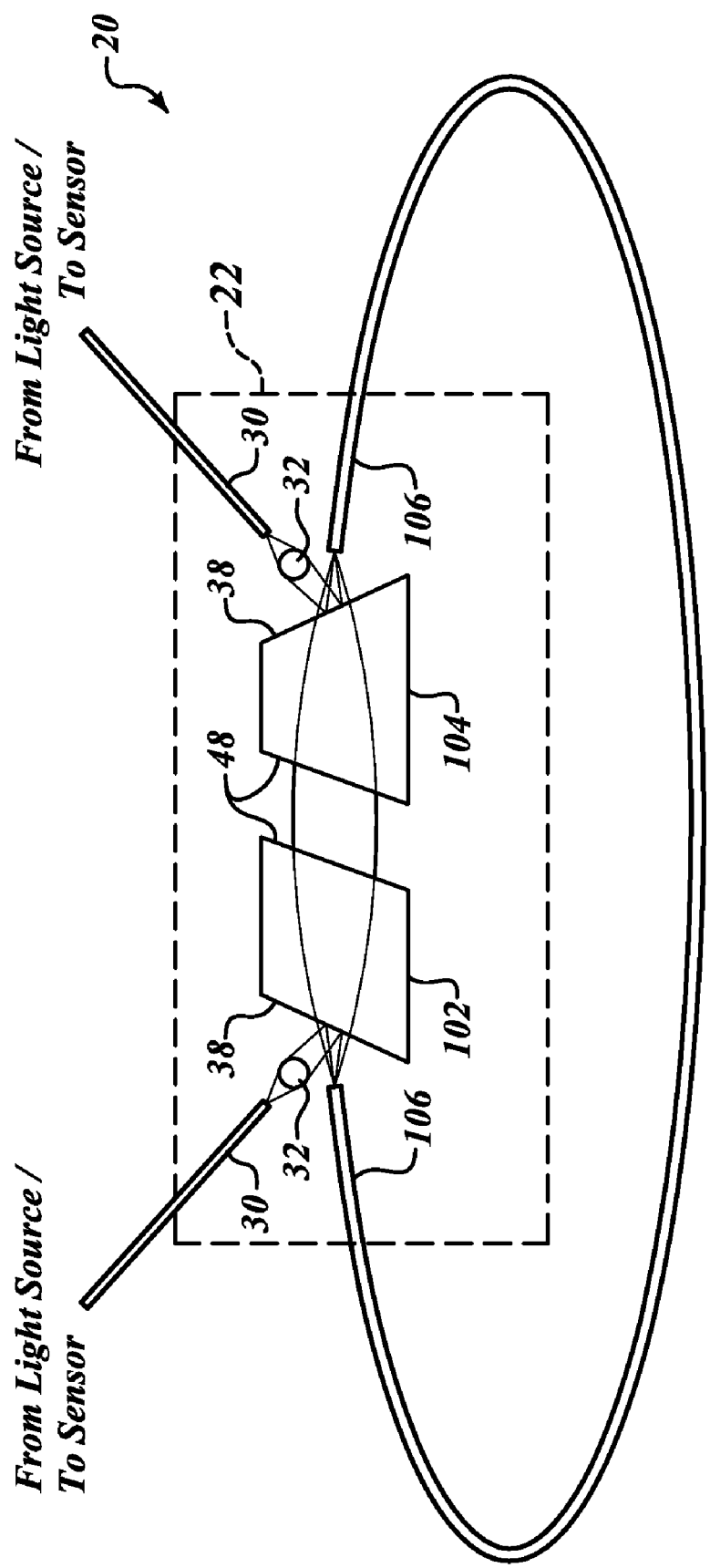
FIG. 3 illustrates a partial view of an example resonator sensing device formed in accordance with an alternate embodiment of the present invention.

FIG. 3 shows an alternate coupler that employs two <¼ pitch GRIN lenses 102, 104 instead of one <½ pitch GRIN lens (FIG. 1). Edges 48 have anti-reflection (AR) coatings at the appropriate wavelength to minimize loss. After the subassembly step, two subassembly mounts are mated with the individual GRIN lenses 102, 104. Light is launched on one end, e.g. through a fiber at the edge 38 of GRIN lens 102 and reflected in fiber 106. The other GRIN lens 104 is aligned so that the light between the GRIN lenses 102 and 104 is collimated. This other side is then aligned. Then, the two GRIN lenses 102, 104 are positioned to form a resonator. Then, all components are bonded into an external sleeve (not shown). This implementation is easier to manufacture but has a reduced cost to resonator performance ratio.

While the preferred embodiment of the invention has been illustrated and described, as noted above, many changes can be made without departing from the spirit and scope of the invention. For example, the coupler may also be implemented using a silicon bench to place the components. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A resonator sensing device comprising:
   a photonic bandgap resonator fiber having a first end and a second end;
   a graded index (GRIN) lens;
   at least one microlens; and
   at least one source fiber,
   wherein the GRIN lens includes two surfaces angled
      to allow light emanated from the at least one source fiber via the at least one microlens to reflect from a first surface of the GRIN lens into the first end of the resonator fiber,
      to allow a portion of light emanated from the second end of the resonator fiber to pass through the GRIN lens and be received by the first end of the resonator fiber, and
      to allow a portion of the light emanated from the second end of the resonator fiber to be reflected, as at least one sensing light signal, from a second surface of the GRIN lens into the at least one source fiber via the at least one microlens.

2. The device of claim 1, wherein the surfaces of the GRIN lens are coated with a dielectric.

3. The device of claim 2, wherein the photonic bandgap resonator fiber includes a hollow core fiber.

4. The device of claim 1, further comprising a jig configured to receive an end of the photonic bandgap resonator fiber, one of the at least one microlens and one of the at least one source fiber.

5. A resonator sensing device comprising:
   a photonic bandgap resonator fiber having a first end and a second end;
   a first graded index (GRIN) lens;
   a second graded index (GRIN) lens;
   at least one microlens; and
   at least one source fiber,
   wherein the first GRIN lens includes a surface angled to allow light emanated from the at least one microlens and the at least source fiber to reflect into the first end of the resonator fiber,
   wherein the second GRIN lens is positioned to allow a portion of light emanated from the second end of the resonator fiber to pass through to said first GRIN lens and be received by the first end of the resonator fiber, and to allow a portion of the light emanated from the second end of the resonator fiber to be reflected, as at least one sensing light signal, into the at least one source fiber via the at least one microlens.

6. The device of claim 5, wherein the surfaces of the GRIN lens are coated with a dielectric.

7. The device of claim 6, wherein the photonic bandgap resonator fiber includes a hollow core fiber.

8. The device of claim 5, further comprising a jig configured to receive an end of the photonic bandgap resonator fiber, one of the at least one microlens and one of the at least one source fiber.

9. A method for making resonator sensing device, the method comprising:
   placing an end of a source fiber into a jig, wherein the source fiber being previously configured to receive light from a light source and deliver light to a sensor;
   placing a mirror on the jig at an expected location for a graded index (GRIN) lens;
   placing a microlens on the jig between the source fiber end and the mirror;
   placing one end of a photonic bandgap resonator fiber on the jig at a predefined angular relationship from the placed end of the source fiber and the microlens relative to the mirror;
   sending a light signal out of the end of the resonator fiber, off the mirror, into the end of the source fiber via the microlens;
   sensing the sent light signal at the sensor; and
   adjusting a location on the jig of at least one of the end of a source fiber, the microlens, or the resonator fiber based on the sensed light signal.

10. The method of claim 9, further comprising:
    removing the mirror; and
    inserting the GRIN lens.

11. The method of claim 10, further comprising adjusting a location of the GRIN lens for proper alignment.

12. The device of claim 1, wherein the at least one source fiber includes a first source fiber and a second source fiber, wherein the at least one microlens comprises a first microlens and a second microlens,
    wherein the light emanated from the at least one source fiber via the at least one microlens and reflected into the first end of the resonator fiber comprises
       light emanated from the first source fiber via the first microlens and reflected into the first end of the resonator fiber,
    wherein the portion of the light emanated from the second end of the resonator fiber that is reflected, as the at least one sensing light signal, from the second surface of the GRIN lens into the at least one source fiber via the at least one microlens comprises a portion of the light emanated from the second end of the resonator fiber that is reflected, as a first sensing light signal, from the second surface of the GRIN lens into the second source fiber via the second microlens, and wherein the GRIN lens also:

allows light emanated from the second source fiber via the second microlens to reflect from the second surface of the GRIN lens into the second end of the resonator fiber, allows a portion of light emanated from the first end of the resonator fiber to pass through the GRIN lens and be received by the second end of the resonator fiber, and allows a portion of the light emanated from the first end of the resonator fiber to be reflected, as a second sensing light signal, from the first surface of the GRIN lens into the first source fiber via the first microlens.

13. The device of claim 5, wherein the at least one source fiber includes a first source fiber and a second source fiber, wherein the at least one microlens comprises a first microlens and a second microlens, wherein the light emanated from the at least one microlens and the at least one source fiber and reflected into the first end of the resonator fiber comprises light emanated from the first microlens and the first source fiber and reflected into the first end of the resonator fiber, wherein the portion of the light emanated from the second end of the resonator fiber that is reflected, as at least one sensing light signal, into the at least one source fiber via the at least one microlens comprises a portion of the light emanated from the second end of the resonator fiber that is reflected, as a first sensing light signal, into the second source fiber via the second microlens, and wherein the second GRIN lens includes a surface angled to allow the light emanated from the second microlens and the second source fiber to reflect into the second end of the resonator fiber, wherein the first GRIN lens is positioned to allow a portion of light emanated from the first end of the resonator fiber to pass through to said second GRIN lens and be received by the second end of the resonator fiber, and to allow a portion of the light emanated from the first end of the resonator fiber to be reflected, as a second sensing light signal, into the first source fiber via the first microlens.

\* \* \* \* \*